United States Patent [19]

Izumiya

[11] Patent Number: 4,992,169
[45] Date of Patent: Feb. 12, 1991

[54] OZONE GENERATING MEANS AND WATER QUALITY IMPROVING APPARATUS USING THE SAME

[75] Inventor: Tooru Izumiya, Tokyo, Japan

[73] Assignee: Nippon Nature Roman Corporation Limited, Japan

[21] Appl. No.: 460,286

[22] Filed: Jan. 3, 1990

[30] Foreign Application Priority Data

Mar. 25, 1989 [JP] Japan .............................. 1-34093[U]

[51] Int. Cl.$^5$ .............................................. C02F 1/78
[52] U.S. Cl. .................... 210/221.2; 210/244; 250/432 R; 250/436; 250/437; 422/24; 422/186.07; 261/DIG. 42; 261/121.1
[58] Field of Search ............... 210/274, 175, 192, 220, 210/221.2, 244; 261/DIG. 42, 121.1; 250/432 R, 436, 437; 422/24, 186.07, 186.7

[56] References Cited

U.S. PATENT DOCUMENTS 4,603,031  7/1986  Gelbman ................. 422/186.18

Primary Examiner—W. Gary Jones
Assistant Examiner—David Reifsnyder
Attorney, Agent, or Firm—Brumbaugh, Graves, Donohue & Raymond

[57] ABSTRACT

The present invention relates to an ozone generating apparatus most suitable for use for a water quality improving apparatus by which the amount of oxygen dissolved in water is increased, and chlorine or carcinogenic noxious substances such as trihalomethanes contained in city water are decomposed.

In the present invention, a ultraviolet generating means is formed in a container body, a pipe member is arranged to extend through said container body, and a part of the pipe member that is located in said container body is formed with a plurality of hole members thereby allowing the ozone generated by the ultraviolet generating means to be sucked through the hole members and to be transported.

Projections for reducing the pipe cross sectional area are formed on the inner wall of the pipe member adjacent to the holes to extend in the direction from the connection of the pipe member with a gas supplying means toward the hole members, so that the sucking force of ozone can be improved.

When the present invention is applied to a water quality improving apparatus for drinking water, filthy water, or the like, a compact and high-performance wate quality improving apparatus can be provided.

8 Claims, 2 Drawing Sheets

OZONE GENERATING MEANS AND WATER QUALITY IMPROVING APPARATUS USING THE SAME

BACKGROUND OF THE INVENTION

The present invention relates to an ozone generating apparatus most suitable for use for a water quality improving apparatus by which the amount of oxygen dissolved in water is increased, and chlorine or carcinogenic noxious substances such as trihalomethanes contained in city water are decomposed, and particularly to an ozone generating apparatus whose ozone generating efficiency is high. The present invention also relates to a water quality improving apparatus using the ozone generating means to prevent various common bacteria from reproducing as well as to improve the decomposition rate of carcinogens.

It is well known that chlorine is conventionally mixed into city water for the sterilization. The sterilization with chlorine have greatly contributed to the prevention of infectious epidemics after the war. However, it has been found that the chlorine reacts chemically with humic acids naturally contained in the raw water that is taken in thereby leading to the formation of carcinogenic substances such as trihalomethanes. Particularly, the influence of this on babies and infants is a serious problem, and it is guided to boil the water to be used for the preparation of milk from powdered milk or the like and to cool the prepared milk for feeding.

Various water treating apparatuses including water purifiers have been developed, and there are devised a type using a filter such as a microfilter for removing foreign matter and various bacteria, and a type using an ion exchanger for increasing ions in water. Further, recently, water purifiers equipped with an ozonizer are devised in which the idea is placed on the biocidal and purifying actions of ozone. The ozonizer used in these purifiers for converting oxygen to ozone uses a system wherein silent discharge is effected in dry air or a system wherein ultraviolet light having a wavelength of 184.9 nm is generated by a quarts glass tube thereby producing ozone. The system for obtaining ozone by carrying out silent discharge in dry air has problems that the apparatus becomes large-sized, and $NO_x$ harmful to the human body is generated, and therefore, for a small-sized ozonizer, there is an increasing tendency to employ the system using a quartz glass tube. For the ozonizer using a quartz glass tube, there is a system wherein one end of a box containing a quartz glass tube is opened and the other end is connected to a blower placed outside so that the air and the ozone in the box are blown simultaneously (first system), and a system wherein pressurized air is blown into one end of a box containing a quartz glass tube, and the discharge is effected from the other end (second system).

However, in the conventional first system using a quartz glass tube, air and ozone are simultaneously taken into the blower, and therefore there is a problem that the inside of the blower is corroded by the strong oxidizing power of the ozone. In the second system using a quartz glass tube, since pressurized air is blown around the quartz glass tube all the time, there is a problem that the surface of the quartz tube is cooled. This problem is serious because the ozone generating efficiency of a quartz glass tube becomes maximum when its temperature is about 60° to 70° C. and the ozone generating efficiency decreases when the surface of the quartz glass tube is cooled.

BRIEF DESCRIPTION OF THE DRAWINGS

The drawings illustrate embodiments of the present invention.

DETAILED DESCRIPTION OF THE INVENTION

Figure 1:
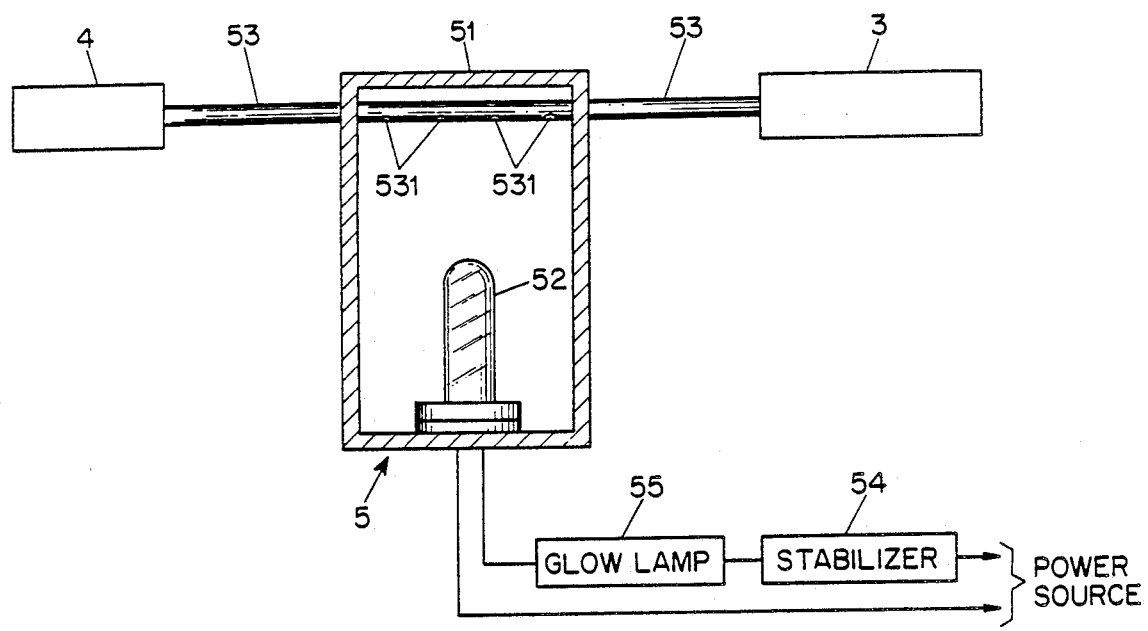
FIG. 1 is a diagram showing the constitution of an ozone generating means of the embodiment.
Figure 2:
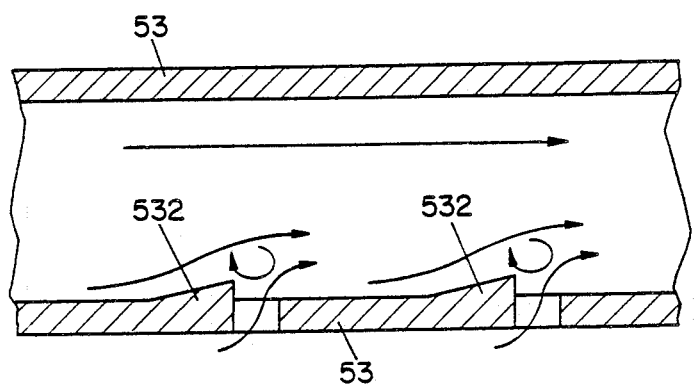
FIG. 2 is a cross sectional view of a hollow pipe.
Figure 3:
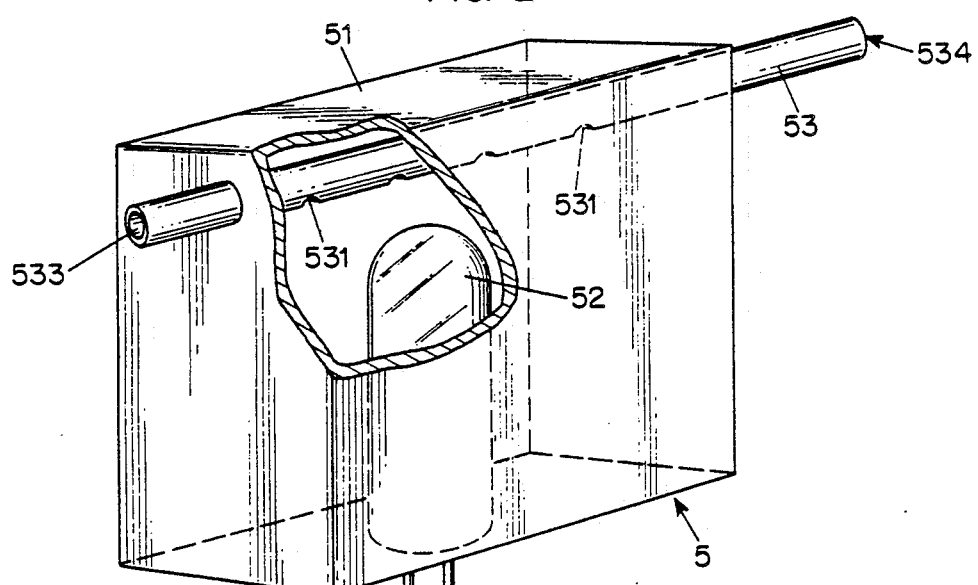
FIG. 3 is a perspective view illustrating the ozone generating means.

An embodiment of the present invention will now be described with reference to the drawings. Referring to FIGS. 1 to 3, an ozone generating means 5 consists of an ozone generating chamber 51, a quartz ultraviolet lamp 52, a hollow pipe 53, a stabilizer 54, and a glow lamp 55. The ozone generating chamber 51 is a container that can be closed, and is equipped with the quartz ultraviolet lamp 52 placed therein as shown in FIG. 1. The hollow pipe 53 is extended through the ozone generating chamber 51.

The quartz ultraviolet lamp 52 is for generating ozone, comprises a low-pressure mercury discharge glass lamp whose outer tube is a transparent quartz tube, and is constituted such that the ultraviolet light of short wavelength (far-ultraviolet light) generated by the discharge of the mercury vapor therein is absorbed little by the outer tube and all of it is radiated outside. In particular, the quartz ultraviolet lamp 52 whose ultraviolet light has a wavelength of 185 nm can generate ultraviolet light called ozone beam that can generate ozone in the air. Thus the quartz ultraviolet lamp 52 acts as a ultraviolet generating means. The stabilizer 54 and the glow lamp 55 function in the same way as those of a common fluorescent lamp, and start the quartz ultraviolet lamp 52 as well as stabilize the discharge current after the start. The quartz ultraviolet lamp 52 can be driven by using an inverter instead of the glow lamp 55. Since the quartz ultraviolet lamp 52 does not produce nitrogen compounds, it has an effect that it is quite safe. It is desirable that the attachment of the quartz ultraviolet lamp 52 to the ozone generating chamber 51 is made by using a suitable socket 521 and a packing 522 excellent in airtightness.

The hollow pipe 53 comprises a pipe member, and as shown in FIG. 3, one end of the hollow pipe 53 constitutes an inflow section 533, and the other end constitutes an outflow section 534. The inflow section 533 is constructed in such a manner that it can be connected to a gas supplying means, and the outflow section 534 is constituted in such a manner that it can be connected to a bubble generating means. A part of the hollow pipe 53 that is situated in the ozone generating chamber 51 is formed with a plurality of holes 531, 531, . . . as shown in FIG. 2, and projections 532, 532, . . . are formed on the inner wall of the hollow pipe adjacent to the holes 531. The projections 532, 532, . . . are slanted upward in the direction from the inflow section 534 toward the holes 531.

In the thus constituted ozone generating means 4, when air is sent from the inflow section 533 of the hollow pipe 53, the air flows along the projections 532 formed in the hollow pipe 53. The projections 532 are constructed in such a manner that the cross sectional area of the hollow pipe 53 is reduced gradually in the direction of the flow of the air in the hollow pipe 53. Therefore, the air flowing in the hollow pipe 53 is accelerated over the projections 532, and when the air flowing in the hollow pipe 53 reaches the holes 531, the flow velocity lowers and swirls occur since the cross sectional area increases radically. The occurrence of the swirls develops turbulence, and results in a pressure drop. As a result of the pressure drop, on the same principle as that of a spray, the gas mixture of air and ozone in the ozone generating chamber 51 can be sucked into the hollow pipe 53. The thus sucked gas mixture containing ozone is carried through the hollow pipe 53, and can be fed forcibly to the bubble generating means from the outflow section 534.

The thus constituted embodiment has an effect that the flow of air is not blown directly against the quartz ultraviolet lamp 52. The ozone generating efficiency of the quartz ultraviolet lamp 52 reaches the maximum at about 60° to 70° C., and the ozone generating efficiency lowers at temperatures over 70° C. or below 60° C. However, in this embodiment, since the flow of air in the ozone generating chamber 51 is not allowed to convect or is radiated, the quartz ultraviolet lamp 52 is not cooled, so that there is an excellent effect that the ozone generating efficiency would not be lowered.

The cross sectional shape of the hollow pipe 53 is not limited to a circle, and can be a rectangle or like. A plurality of hollow pipes 53 can be extended through the ozone generating chamber 51.

Now, a water quality improving apparatus 1 that uses the ozone generating means 5 described above will be described.

Figure 4:
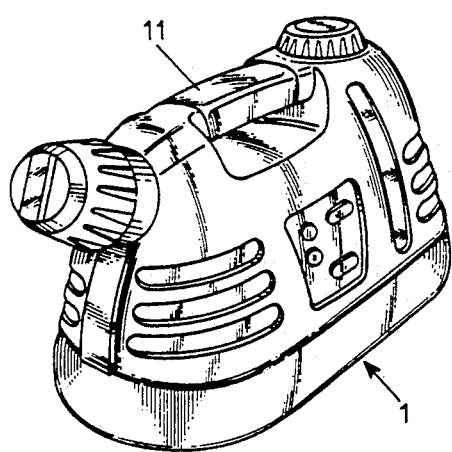
FIG. 4 is a perspective view of a water quality improving apparatus body.
Figure 5:
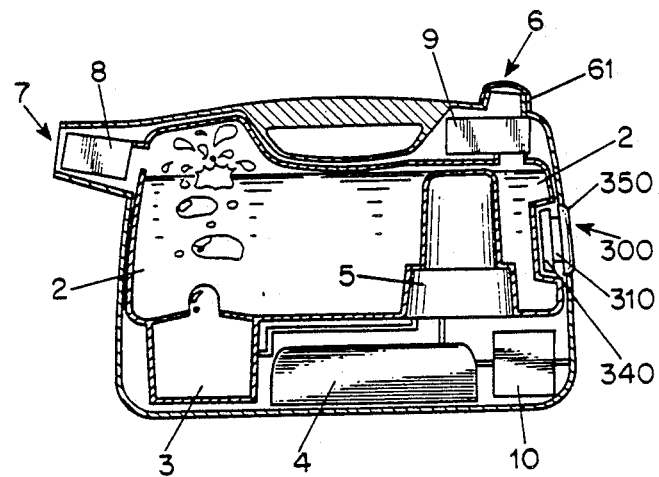
FIG. 5 is a view illustrating the constitution of the water quality improving apparatus.

As shown in FIGS. 4 and 5, reference numeral 1 indicates a water quality improving apparatus body, which is composed of a tank body 2, a bubble generating means 3, an air pump 4, an ozone generating means 5, an inflow port 6, an outflow port 7, an ozone absorbing means 8, a filter member 9, and an air filter 10.

As shown in FIG. 4, the water quality improving apparatus 1 has a handle 11, and is in the shape of a pot, making it of a portable type, but it can take any shape. The tank body 2 is for storing city water or the like so that the quality of the water can be improved while it is stored therein. The bubble generating means 3 forms bubbles from the gas fed through the air pump 4, and releases the bubbles into the city water in the tank.

Figure 6:
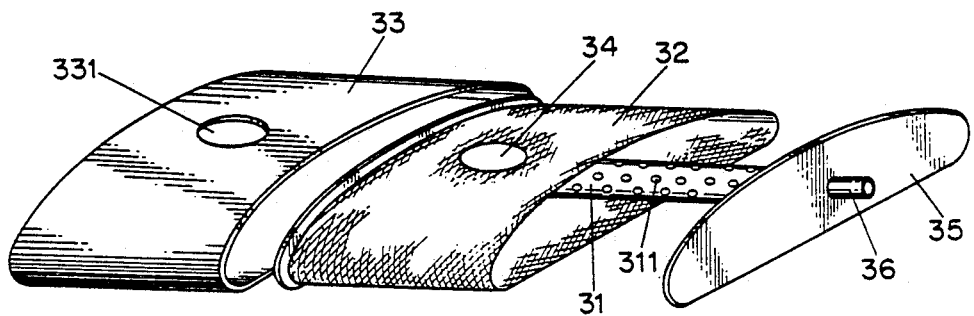
FIG. 6 is a view showing the constitution of a bubble generating apparatus.
Figure 7:
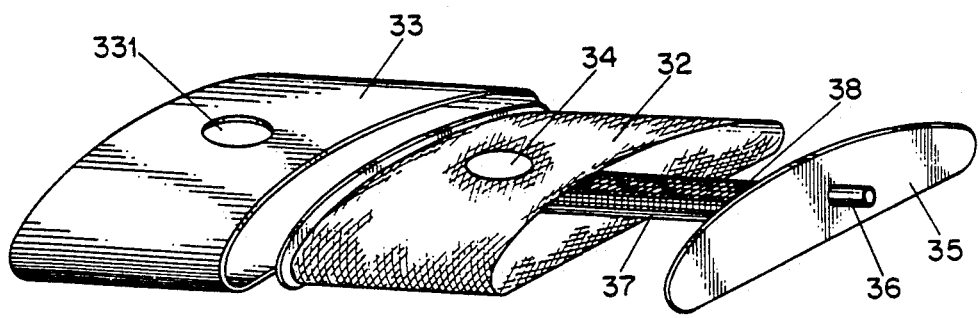
FIG. 7 is a view showing a modification of the bubble generating apparatus.

Now, referring to FIG. 6, the bubble generating means 3 will be described in detail. The bubble generating means 3 is composed of a hollow cylindrical member 31, a net member 32, an outer frame body 33, an opening section 34 formed in the net member 32, and a side wall member 35. The hollow cylindrical member 31 is formed with a plurality of holes 311, 311, . . . drilled in its outer circumference, and has a connecting section 36 for the connection to the air pump 4, the connecting section 36 extending from the side wall member 35. Although the hollow cylindrical member 31 of this embodiment is in the shape of a cylinder, the shape is not limited to a cylindrical shape, and can take any shape like a rectangular parallelepiped shape. The net member 32 covers at least the upper part of the hollow cylindrical member 31, and has a curvature. The net member 31 is formed with the opening section 34 thereby allowing bubbles grown to large sizes to be released into water. As the material of the net member 32 can be used any material, with stainless steel desirable. The outer frame member 33 having an opening 331 is positioned outside the net member 32.

By housing the net member 32 in the outer frame member 33, then housing the hollow cylindrical member 31 in the net member 32, and securing the side wall member 35 to the side, the bubble generating means 3 can be made up.

The operation of the bubble generating means 3 will now be described. The connecting section 36 connected to the hollow cylindrical member 31 and the air pump 4 are connected through a suitable hose member, and a gas is pumped from the air pump 4 into the bubble generating means 3. The gas fed into the hollow cylindrical member 31 flows outside from the plurality of holes 311, 311, . . . , during which it takes the form of bubbles. The size of the bubbles will be determined, for example, by the surface tension and the temperature of the water, and the shape of the hollow cylindrical member 31. Accordingly, the size of the holes will not correspond necessarily to the size of the bubbles. For example, if the diameter of the holes 311, 311, . . . of the hollow cylindrical member 31 is 2.5 mm, the bubbles that will be formed will have a diameter ranging from about 0.1 mm to 20 mm. The bubbles will break and collide with each other to combine into bigger bubbles until they reach the net member 32. If the mesh of the net member 32 is, for example, made to be on the order of 2.5 to 3.0 mm, fine bubbles can pass through the net member 32 and move upward, whereas bubbles grown larger than the mesh will stay below the net member 32, and will grow larger while they ascend along the curved surface. During that, the bubbles generate ultrasonic waves and decompose various compounds. Here, although larger bubbles staying below the net member 32 have buoyancy, if the buoyancy is lower than the water pressure exerted to the opening section 34 (for example having a diameter on the order of 20 mm) formed in the net member 32, the bubbles are forced down by the water pressure, and cannot move upward through the opening section 34. However, when the bubbles grow and their buoyancy increases to become greater than the water pressure exerted to the opening section 34, the grown large bubbles can move upward through the opening section 34 of the net member 32. Since at that time the volume of the stayed bubbles is too large to pass through the opening section in a moment, the bubbles are compressed. Immediately after passing the net member 32, the bubbles expand until the buoyancy balances with the water pressure. Since the diameter of the opening section 34 is on the order of 20 mm, large bubbles are broken in a moment into small bubbles to pass through the opening section 34, and then the small bubbles combine together to form large bubbles. At that time, since the water present on the large bubbles is pushed up, swirling currents are generated in the water. Thus, the inside of a tank chamber 2 can be stirred by the swirling currents. Then, when the bubbles pass through the opening section 331 of the outer frame body 33, there are such effects that the shapes of the bubbles are regulated, and, for example, the issuing force of the bubbles can be amplified.

Although in this embodiment the bubble generating means 3 has the hollow member 31 with the plurality of holes 311, 311, . . . , a bubble generating means 3 having no holes 311, 311, . . . as shown in FIG. 4 can be used. This bubble generating means 3 is composed of a gas releasing section 37, a first net member 38 formed on the upper surface of the gas releasing section 37, a net member 32 (serving as a second net member), an outer frame body 33, an opening section 34 formed in the net member 32, and a side wall member 35. The gas releasing section 37 is connected to the air pump 4 for releasing a gas into the water. It is enough if the gas releasing section 37 is composed of a hollow member whose upper surface is opened and the gas releasing section 37 may have a rectangular cross section. The first net member 38 is attached to the upper opening section of the gas releasing section 37, and can generate bubbles. The first net member 38 functions similarly to the holes 311, 311, . . . of the hollow cylindrical member 31 of the above bubble generating means 3. Since, in the first net member 38, it is not required to form holes, there is an effect that the cost of the production of the first net member 38 can be lowered. Since other functions of this embodiment are the same as those of the first embodiment that uses the hollow cylindrical member 31, further explanation is omitted.

The air pump 4 serves as a gas supplying means for pumping a gas to the bubble generating means 3. The air pump 4 may be a suitable gas supplying means such as a compressor. In this air pump 4, blowing pressure is more required than blowing quantity, and therefore a reciprocating pump is preferred to a rotary pump for that purpose.

The inflow port 6 is an opening section, through which city water will be poured into the tank body 2 of the water quality improving apparatus body 1 after the removal of a cap member 61. The filter member 9 is placed between the inflow port 6 and the tank body 2, so that dust, foreign matter or the like in the city water can be removed. As the filter member 9, use can be made of a common filter, which may be combined with a sterilizing filter. The outflow port 7 is provided to allow the water that has been improved in quality and is stored in the tank body 2 to be discharged. The ozone absorbing means 8 is positioned between the outflow port 7 and the tank body 2. The ozone absorbing means 8 is composed of activated charcoal, and absorbs the ozone released from the bubbles in the water as well as the ozone contained in the water that will be flowed from the outflow port 7, so that the peculiar smell of ozone and the dissolved ozone can be absorbed. The ozone absorbing means 8 can also prevent various bacteria from entering from the outside. The air filter 10 is positioned between the open air and the air pump 4, and is constituted in such a manner that dust or foreign matter in the air will not be allowed to come in.

In the water quality improving apparatus body 1 of this embodiment, although the tank chamber 2, the inflow port 6, and the outflow port 7 may be secured in the body, they can be constituted separably. In the latter case, the separated section becomes light in weight, it creates an effect that the transportation for the supply or discharge of water becomes easy.

The ozone generating means 5 can be used not only for the above water quality improving apparatus for drinking water but also for a sewage treating apparatus. That is, if, as the bubble generating means 3, use is made of a gas diffusing pipe, the amount of oxygen dissolved in a purifying treatment tank can be increased thereby not only facilitating the decomposition of filth by bacteria but also lowering the molecular weights of macromolecular compounds by ozone as well as effecting sterilization. Particularly, the sterilizing power of ozone is 50 times as high as that of chlorine, and therefore the amount of chlorine used in the final stage can be decreased.

The thus constituted embodiment can be used not only for water quality improving apparatuses for drinking water and sewage treating apparatuses but also for the purification of pools, water tanks of fish farms, crawls, water tanks for transporting live fish, etc. When this embodiment is used in a pool, the sterilization and purification can be effected with the amount of chlorine kept low, so that there is an effect that the harmful influence on human bodies can be minimized. If it is used for example for a water tank of a fish farm, there are effects that due to the increase in the amount of dissolved oxygen, for example, the culture density can be increased, the growth rate can be improved, and the removal of impurities can prevent occurrence of diseases.

In the thus constituted invention, by forming an ultraviolet generating means in a container body that can be closed, arranging a pipe member to extend through the container body, and forming a plurality of hole members in a part of the pipe member that is located in the container body, ozone generated by the ultraviolet generating means can be sucked through the hole members and then is transported. Further, by constituting one end of the pipe member in such a manner that the one end can be connected to a gas supplying means, and the other end in such a manner that the other end can be connected to a bubble generating means of releasing bubbles into water, and forming projections for reducing the pipe cross sectional area on the inner wall of the pipe member adjacent to the holes in such a manner that the projections extend in the direction from the connection of the pipe member with the gas supplying means toward the hole members, the sucking force of ozone can be improved. In the present water quality improving apparatus, an ozone generating means generates ozone, and the ozone is mixed into the gas to be supplied to the bubble generating means. The bubble generating means can release into water the bubbles wherein the ozone has been mixed. In the present invention, the gas supplied from the gas supplying means is released from the holes formed in a hollow member or from a first net member formed on a gas releasing section, during which the gas takes the form of bubbles. Of these bubbles, relatively large bubbles stay under a net member located above and continue to grow larger. When the buoyancy of the staying bubbles exceeds the water pressure at the opening section formed in the net member, the larger bubbles pass through the opening section formed in the net member and are released upward. The present invention can improve the quality of water, particularly drinking water.

Thus, an ultraviolet generating means is formed in a container body that can be closed, a pipe member is arranged to extend through the container body, and a part of the pipe member that is located in the container body is formed with a plurality of hole members, so that the present invention has an effect that an ozone containing gas mixture can be sucked by using a pressure difference of a flow of air and can be transported. Further, since a flow of air is not blown directly against the ultraviolet generating means to cool the surface of the ultraviolet generating means, there is an excellent effect that the ozone generating efficiency of the ultraviolet generating means would not be lowered. Furthermore, the present invention has an effect that the air in the container body does not convect, highly concentrated ozone can be accumulated, and the highly concentrated ozone containing gas mixture can be sucked through the holes in the pipe member.

Further, since, adjacent to the holes in the inner wall of the pipe member are formed projections for reducing the pipe cross sectional area, which extend in the direction from the connection of the pipe member with the gas supplying means toward the hole members, the flow of air passing through the pipe member is accelerated over the projections and is then decelerated over the holes, and therefore swirls are generated to develop turbulence. As a result, the pressure drops greatly, resulting in an excellent effect that the resulting pressure difference allows the ozone containing gas mixture to be sucked efficiently.

Since the water quality improving apparatus using the present ozone generating means adopts an ozone generating means equipped with a pipe member formed with projections, ozone can be generated efficiently by the ozone generating means that is small in size, and therefore there is an effect that a compact water quality improving apparatus for drinking water can be provided. Further, the water quality improving apparatus for drinking water has effects that the bubble generating means can decompose chlorine and carcinogens such as trihalomethanes, the ozone generated by the ozone generating means can prevent various bacteria from propagating, and the decomposing rate of chlorine, etc. can be increased. Since the bubble generating means and the ozone can increase the amount of oxygen dissolved in water, there is an effect that water good in quality can be provided. The present invention has an effect that since an ozone absorbing means is inserted between the tank body and the outflow port, the ozone smell will not be released outside, and the ozone contained in water that has been taken out can be absorbed.

Since the bubble generating means of the present invention has the net member to have a curvature and an opening section, bubbles are allowed to stay under the curved surface, and when the buoyancy of the bubbles exceeds the water pressure, the bubbles are allowed to rise through the opening section instantly. Therefore, since the bubbles are compressed when passing through the opening section, and then can be expanded after the passage, there is an excellent effect that high-energy bubbles excellent in ability for decomposing chlorine, etc. can be formed. Since the bubble generating means can combine small bubbles to be grown into large bubbles, there is an effect that the gas supplying means can be made small thereby saving energy. The bubble generating means can be provided with a gas releasing section that will be connected to the gas supplying means and a first net member formed at least on the upper surface section of the gas releasing section, and in this case, there is an effect that since it is not required to form holes in the hollow member or the like, the cost can be reduced.

What is claimed is:

1. An ozone generating means comprising a container body that can be closed, a ultraviolet generating means formed in said container body, and a pipe member extending through said container body, a part of said pipe member that is located in said container body being formed with a plurality of holes.

2. An ozone generating means comprising a container body that can be closed, a ultraviolet generating means formed in said container body, and a pipe member extending through said container body, one end of said pipe member being constituted in such a manner that said end can be connected to a gas supplying means, the other end of said pipe member being constituted in such a manner that said other end can be connected to a bubble generating means of releasing bubbles into water, a part of said pipe member that is located in said container body being formed with a plurality of holes, and projections for reducing the pipe cross sectional area being formed on the inner wall of the pipe member adjacent to said holes and being extended in the direction from the connection of the gas supplying means with said pipe member toward said holes.

3. A water quality improving apparatus comprising a bubble generating means of releasing bubbles into water, and an ozone generating means of mixing ozone with a gas that will be supplied to said bubble generating means, wherein an ozone generating means as claimed in claim 1 or 2 is used.

4. A water quality improving apparatus using an ozone generating means as claimed in claim 3, wherein said bubble generating means comprises a hollow member that is formed with a plurality of holes and is to be connected to the gas supplying means, and a net member covering at least the upper section of said hollow member, and the net member has a curvature and is formed with an opening section.

5. A water quality improving apparatus using an ozone generating means as claimed in claim 3, wherein said bubble generating means comprises a gas releasing section that is to be connected to the gas supplying means, a first net member formed at least on the upper surface section of said gas releasing section, and a second net member covering at least the upper section of said first net member, and the second net member has a curvature and is formed with an opening section.

6. A water quality improving apparatus comprising a tank body for storing drinking water, a bubble generating means of releasing bubbles into the drinking water stored in said tank body, a gas supplying means of sending a gas to said bubble generating means, and an ozone generating means of mixing ozone with the gas that will be supplied to said bubble generating means, wherein an ozone generating means as claimed in claim 1 or 2 is used.

7. A water quality improving apparatus using an ozone generator means as claimed in claim 6, wherein said bubble generator means comprises a hollow member that is formed with a plurality of holes and is to be connected to the gas supplying means, and a net member covering at least the upper section of said hollow member, and the net member has a curvature and is formed with an opening section.

8. A water quality improving apparatus using an ozone generating means as claimed in claim 6, wherein said bubble generating means comprises a gas releasing section that is to be connected to the gas supplying means, a first net member formed at least on the upper section of said gas releasing section, and a second net member covering at least the upper section of said first net member, and the second net member has a curvature and is formed with an opening section.

* * * * *